United States Patent
Ko et al.

(10) Patent No.: US 9,644,987 B2
(45) Date of Patent: May 9, 2017

(54) ELECTRONIC APPARATUS, CONTROL METHOD OF ELECTRONIC APPARATUS AND COMPUTER READABLE RECORDING MEDIUM

(71) Applicant: THINKWARE CORPORATION, Seongnam-si, Gyeonggi-do (KR)

(72) Inventors: Suk Pil Ko, Seongnam-si (KR); Gyu Hyeon Park, Seongnam-si (KR); Jang Youl Shin, Seongnam-si (KR)

(73) Assignee: THINKWARE CORPORATION, Seongnam-si, Gyeonggi-do (KR)

( * ) Notice: Subject to any disclaimer, the term of this patent is extended or adjusted under 35 U.S.C. 154(b) by 0 days.

(21) Appl. No.: 14/801,570

(22) Filed: Jul. 16, 2015

(65) Prior Publication Data
US 2016/0018239 A1    Jan. 21, 2016

(30) Foreign Application Priority Data
Jul. 18, 2014 (KR) .................. 10-2014-0091056

(51) Int. Cl.
*G01C 21/36* (2006.01)
(52) U.S. Cl.
CPC .................. *G01C 21/367* (2013.01)

(58) Field of Classification Search
CPC .................. G01C 21/3664; G01C 21/367
USPC ...................................................... 701/425
See application file for complete search history.

(56) References Cited

U.S. PATENT DOCUMENTS

| 7,844,393 | B2 * | 11/2010 | Takizawa ......... | G01C 21/3415 |
| | | | | 340/988 |
| 2005/0004753 | A1 * | 1/2005 | Weiland ................ | G01C 21/32 |
| | | | | 701/532 |
| 2015/0362326 | A1 * | 12/2015 | Fujimoto ............. | G01C 21/367 |
| | | | | 701/428 |

FOREIGN PATENT DOCUMENTS

JP           2015138153 A  *  7/2015  ............. G01C 21/30

* cited by examiner

*Primary Examiner* — Brian P Sweeney
(74) *Attorney, Agent, or Firm* — Novick, Kim & Lee, PLLC; Sang Ho Lee

(57) ABSTRACT

Disclosed herein is a method for controlling an electronic apparatus, wherein the control method may include determining a bidirectional link among a plurality of links forming a map data, the bidirectional link defines a two-way road as one link; generating a virtual link by moving the determined bidirectional link based on the width of a road; and displaying a guide screen using the generated virtual link.

15 Claims, 12 Drawing Sheets

ELECTRONIC APPARATUS, CONTROL METHOD OF ELECTRONIC APPARATUS AND COMPUTER READABLE RECORDING MEDIUM

CROSS-REFERENCE TO RELATED APPLICATIONS

This application claims priority from Korean Patent Application No. 10-2014-0091056, filed on Jul. 18, 2014, in the Korean Intellectual Property Office, the disclosure of which is incorporated herein by reference in its entirety.

TECHNICAL FIELD

The present invention relates to an electronic apparatus, a control method of the electronic apparatus and a computer readable recording medium, and more particularly, an electronic apparatus, a control method of the electronic apparatus and a computer readable recording medium to provide information related with the driving of a vehicle.

BACKGROUND ART

In general, a vehicle is equipped with a navigation apparatus which includes a Global Positioning System (GPS) for confirming a current location of the vehicle and a moving speed of the vehicle or determining a route.

The navigation apparatus calculates location information based on a GPS signal, displays the location of the moving object to a user based on the calculated location information, calculates the optimum route to a desired destination, and guides the user by providing various information related with the route.

In this case, the navigation apparatus may map-match the received GPS signal with a close link among a plurality of links of a prestored map data and displays it.

However, since it is actually hard to use a map data corresponding to an actual road due to increase in a route search speed and a limitation of a storing space, in the conventional navigation apparatus, the location of a moving object may be map-matched with a wrong link, so the location of a moving object may be displayed differently from the actual location.

For example, if a vehicle is located in a region where an actual road does not be reflected to the map data, the location of the vehicle is map-matched to another link which is nearest from the location set based on the GPS signal, so the vehicle may be displayed as being located in a location which is different from the current location.

For this reason, in the conventional art, errors may occur in the information which is supplied to a driver, thus causing any problems with a safe driving.

In particular, if an augmented reality (AR) technology is used, which is able to visually overlap value added information (for example, a graphic component representing a point of interest (POI), a graphic component representing a route to a destination, etc.) on a screen on which a real world that a user actually sees is displayed, it is impossible to accurately provide a graphic component which represents a route to a designation due to an inaccurate map data.

DISCLOSURE OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention has been invented to overcome the aforementioned problems. Therefore, an aspect of the present invention is to provide an electronic apparatus, a control method of the electronic apparatus and a computer readable recording medium, wherein a virtual link is generated with respect to a bidirectional link forming a map data, and a route guide screen and a real time location guide screen can be provided using the generated virtual link.

To achieve the above objects, there is provided a method for controlling an electronic apparatus, which may include, but is not limited to, determining a bidirectional link among a plurality of links forming a map data, the bidirectional link defines a two-way road as one link; generating a virtual link by moving the determined bidirectional link based on the width of a road; and displaying a guide screen using the generated virtual link.

In addition, there is further provided receiving a user input which requests a route guide to a destination, and the determining step determines a bidirectional link with respect to a route from the current location of a vehicle to the destination by using the map data.

In addition, there is further provided generating a correction link by connecting a single direction link with respect to a route from the current location of the vehicle to the destination with the generated virtual link, generating the route based on the generated correction link and the displaying step display a route guide screen which represents the vehicle identifier representing a real time location of the vehicle on the generated route.

In addition, the determining step determines a bidirectional link among the links in a predetermined range based on the current location of the vehicle, and further comprises generating a correction link by connecting a single direction link in a predetermined range from the current location of the vehicle and the generated virtual link, and the displaying step displays a location guide screen which represents the vehicle identifier representing a real time location of the vehicle on the generated correction link.

In addition, if the bidirectional link is included in the link corresponding to a Y-shaped road, the step for generating the virtual link further includes generating a virtual link by moving the bidirectional link into the first direction by using a movement size which is determined based on the width of a road with respect to the bidirectional link, and further comprises generating a correction link by connecting a virtual node of the virtual link and a node of a single direction link being close to the bidirectional link, wherein the link corresponding to the Y-shaped road is a link wherein the bidirectional link is divided into at least two single direction links or at least two single directional links are combined into a bidirectional link.

In addition, if the bidirectional link is included in a link corresponding to a U-turn road, the step for generating the virtual link includes generating first virtual link and second virtual link by moving the bidirectional link in first direction and second direction using the movement size which is determined based on the width of the road with respect to the bidirectional link, and further comprises generating an interpolating point at a predetermined distance apart from the node of the bidirectional link, and generating a correction link by connecting the interpolating point and the first virtual link and second virtual link.

In addition, the displaying step includes generating an indicator for an augmented reality (AR), and displaying a guide screen which displays the generated indicator through the AR.

To achieve the above objects, there is provided an electronic apparatus, which may include, but is not limited to, a display unit for displaying a screen; a storing unit for storing a map data; a link generation unit which determines a bidirectional link, that defines a two-way road as one link, among a plurality of links forming a map data, and generate a virtual link by moving the determined bidirectional link based on the width of a road; and a control unit which controls the display unit to display a guide screen using the generated virtual link.

In addition, there is further provided an input unit which receives a user input who requests a route guide to a destination, and the link generation unit determines a bidirectional link with respect to the route from the current location of the vehicle to the destination by using the map data.

In addition, the link generation unit generates a correction link by connecting a single direction link with respect to a route from the current location of the vehicle to the destination and the generated virtual link, and the control unit generates a route based on the generated correction link and controls the display unit to display a route guide screen which represents the vehicle identifier representing a real time location of the vehicle on the generated route.

In addition, the link generation unit determines a bidirectional link among the links in a predetermined range based on the current location of the vehicle and generates a correction link by connecting a single direction link in a predetermined range from the current location of the vehicle and the generated virtual link, and the control unit controls the display unit to display a location guide screen which represents the vehicle identifier representing a real time location of the vehicle on the generated correction link.

In addition, if the bidirectional link is included in a link corresponding to a Y-shaped road, the link generation unit generates a virtual link by moving the bidirectional link in the first direction using the movement size determined based on the width of the road with respect to the bidirectional link, and generates a correction link by connecting a virtual node of the virtual link and a node of the single direction link close to the bidirectional link, and the link corresponding to the Y-shaped road is a link wherein the bidirectional link is divided into at least two single directional links or at least two single directional links are combined into a bidirectional link.

In addition, if the bidirectional link is included in a link corresponding to the U-turn road, the link generation unit generates first virtual link and second virtual link by moving the bidirectional link into first direction and second direction using the movement size determined based on the width of the road with respect to the bidirectional link, generates an interpolating point at a predetermined distance apart from the node of the bidirectional link, and generate a correction link by connecting the interpolating point and the first virtual link and second virtual link.

In addition, there is further provided an augmented reality (AR) provision unit which generates an indicator for an AR, and the display unit displays a guide screen which displays the generated indicator through the AR.

According to the above-described various exemplary embodiments, it is not necessary to increase a route search speed, as well as, without increasing the amount of a map data, and it is possible to display a route guide indicator representing a route from the current location to a destination on an accurate position, and the real time location of the vehicle can be displayed on an accurate position.

BRIEF DESCRIPTION OF THE DRAWINGS

The present invention will become better understood with reference to the accompanying drawings which are given only by way of illustration and thus are not limitative of the present invention, wherein.

MODES FOR CARRYING OUT THE INVENTION

Figure 1:
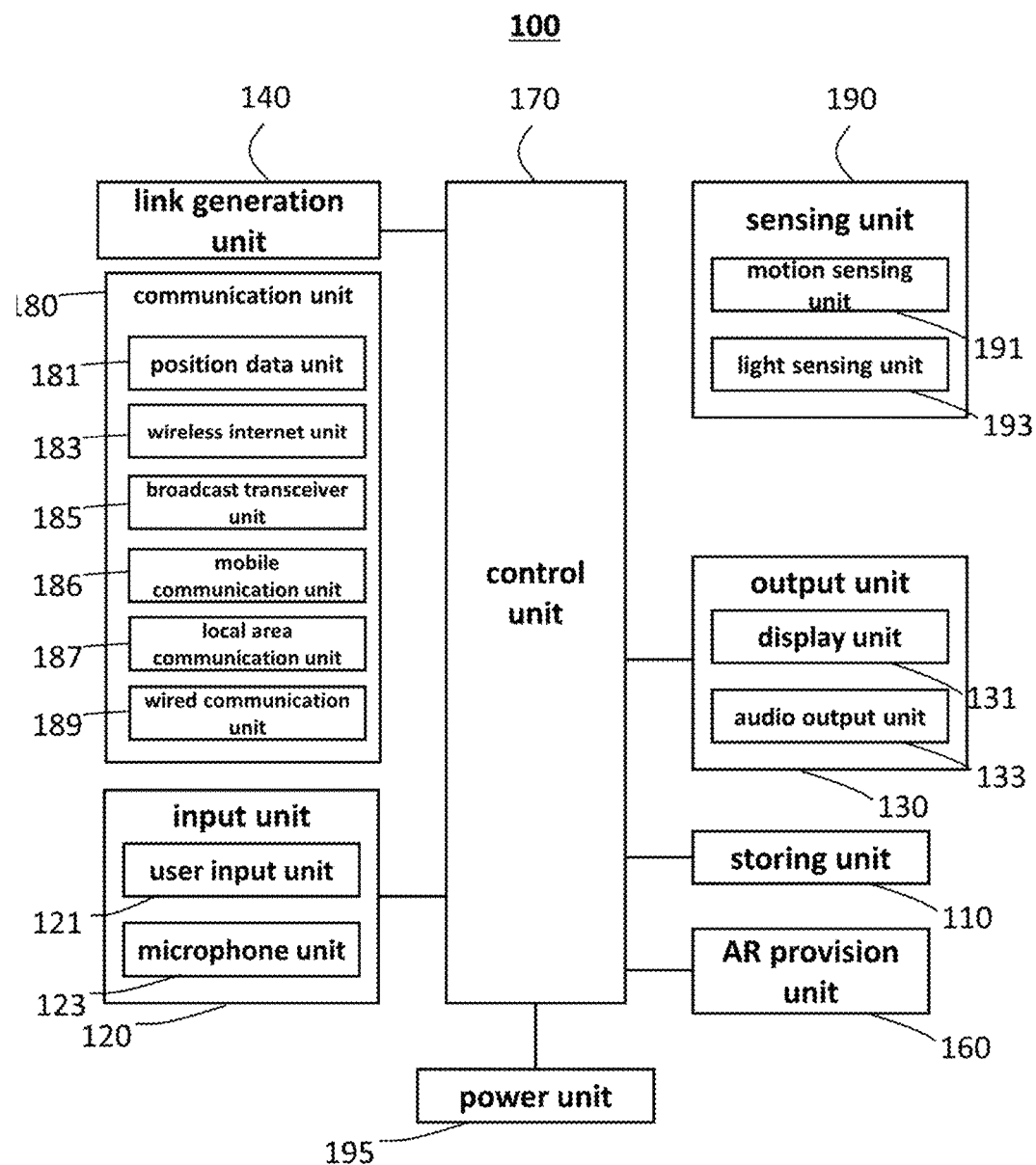
FIG. 1 is a block diagram illustrating an electronic apparatus according to an exemplary embodiment of the present invention.

The descriptions hereinafter propose the principles of the invention, so it is obvious that a person having ordinary skill in the art can implement the principle of the invention even though it is not described or depicted in the present specification and can invent various apparatuses included in the concept and scope of the invention. In addition, it should be understood that the conditional terms and embodiments listed in the present invention are principally intended to help the concepts of the present invention to be fully understood, not limiting the listed embodiments and states.

In addition, it should be understood that all the detailed descriptions listing the principle, view point and embodiments as well as specific embodiments of the present invention are intended to include the structural and functional equivalents of these matters. In addition, it should be understood that these equivalent matters include all the devices invented to perform the same functions irrespective of the currently known equivalent matters as well as the equivalent matters, namely, structures which will be developed in the future.

Therefore, for example, it should be understood that the block diagrams of the present specification are intended to show the conception view points of the exemplary circuits which embody the principles of the present invention. In similar ways, all the flows, state conversion diagrams, pseudo codes, etc. may be substantially expressed on a computer readable medium and may represent various processes which can be executed by a computer or a processor irrespective of whether the computer or the processor is clearly illustrated or not.

The functions of various element depicted in the drawings and including the processor or the functional blocks indicates in the form of similar concepts may be executed using an exclusive hardware as well as the hardware which has abilities to execute the related software. When it is provided by the processor, the above functions may be provided by a single exclusive processor, a single shared processor or a plurality of individual processors, and a part of them may be shared.

The correct use of the processor or the term which is suggested as a concept similar therewith should not be interpreted in such a way to exclusively cite the hardware which has an ability to execute software, and it should be interpreted that it is indented to implicitly include ROM, RAM and a nonvolatile memory. Well known other hardware may be included.

In the claims of the present specification, the components expressed as a method of executing the functions recited in the detailed descriptions are intended to include all the methods for executing the functions which include all types of software including a combination of circuit elements performing, for example, the above functions or a firmware/ micro code, etc. and may be combined with an appropriate circuit to execute the software. It should be understood that the present invention defined by such claims is combined with the functions provided by variously listed means and with the ways that the claims require, so any means for providing the above functions should be understood to be equivalent to what can be recognized from the present specification.

The above-described objects, features and advantages could become clear with the aid of the following descriptions in relation with the accompanying drawings, and a person having ordinary skill in the art to which the present invention pertains can easily implement the technical concepts of the present invention. In addition, while the present invention is being described, if it is judged that the descriptions with respect to the known technology in relation with the present invention may make unclear the subject matters of the present invention, such detailed descriptions would be omitted.

Various embodiments of the present invention will be described with reference to the accompanying drawings.

FIG. 1 is a block diagram illustrating an electronic apparatus according to an exemplary embodiment of the present invention.

Referring to FIG. 1, the electronic apparatus 100 may include, but is not limited to, all or some of a storing unit 110, an input unit 120, an output unit 130, a link generation unit 140, an augmented reality (AR) provision unit 160, a control unit 170, a communication unit 180, and a sensing unit 190.

Here, the electronic apparatus 100 may be implemented using a smart phone, a tablet computer, a palm computer, a PDA (Personal Digital Assistant), a PMP (Portable Multimedia Player), a smart glass, a project glass, a navigation, a black box, etc. each of which may provide to a vehicle driver a driving-related information.

Here, the driving state of the vehicle may include, not limited to, a variety of states where the vehicle is being driven by a driver, for example, a stopping state of the vehicle, a running state of the vehicle, a parking state of the vehicle, etc.

The driving-related guide may include, not limited to, a variety of guides to assist the driving of a vehicle driver, for example, a road guide, a line departure guide, a forward vehicle starting guide, a signal guide, a signal change guide, a forward vehicle collision guide, a lane change guide, a lane guide, a real time location guide, etc.

Here, the road guide may include, but limited to, an augmented reality road guide performing road guide by combining various information, for example, a user's location, direction, etc. with the images of the forward scenes of the currently driving vehicle, and a 2D (2-Dimensional) or 3D (3-Dimensional) road guide performing a road guide by combing the map data of the 2D or 3D with various information, for example, a user's location, direction, etc.

Here, the road guide may be interpreted as an occasion wherein a driver drives on the vehicle as well as a concept including a road guide where a user moves walking or running.

In addition, the line departure guide may provide information representing whether or not the running vehicle departs from the line.

Further, the forward vehicle starting guide may provide information representing whether or not the vehicle located in front of own vehicle starts.

In addition, the signal guide may provide information representing the signal states of a signal lamp positioned in front of the driving vehicle, for example, a stop signal, a straight signal, a left turn signal, a right turn signal, etc. Here, the colors and types corresponding to each signal may be different for each nation. In case of Korea, the stop signal is a red color, the straight signal is a green color, the left turn signal is a green color and a left turn arrow, and the right turn signal is a green color and a right turn arrow.

In addition, the signal change guide may provide information representing whether or not the signal state, for example, a signal lamp positioned in front of the driving vehicle, has changed. For an example, if the signal changed from the stop signal to the straight signal, this may be guided.

In addition, the forward vehicle collision prevention guide may provide information representing a collision with the forward vehicle when the distance to the forward vehicle in front of the stopping or running own vehicle becomes within a predetermined distance.

In addition, the lane change guide may provide information representing whether or not a lane change is necessary for the sake of a route guide to the destination.

In addition, the lane guide may provide information representing the lane where the vehicle is currently located.

In addition, the real time location guide may provide information representing the current location of a vehicle in real time.

For an example, the real time location guide may be executed by displaying vehicle identifier indicating the real time location of the vehicle on the map.

The driving-related images which help various driving guide functions may be photographed in real time by the camera hung in the forward direction. Here the camera may be a camera which may be integrally formed with the electronic apparatus 100 hung in the vehicle so as to photograph the forward scenes of the vehicle. In this case, the camera may be integral with the smart phone, the navigation or the black box, and the electronic apparatus 100 may receive the images photographed by the integral camera.

As another example, the camera may be hung different from the electronic apparatus 100 and may photograph the forward scenes of the vehicle. In this case, the camera may be a separate black box which hung for the forward direction of the vehicle, and the electronic apparatus 100 may receive the photographed images according to a wired/wireless communication with the separately hung black box or may receive the photographed images when a storing medium for storing the photographed images of the black box is inserted in the electronic apparatus 100.

Hereinafter, the electronic apparatus 100 according to an embodiment of the present invention will be described in more details according to the above contents.

The storing unit 110 has a function for storing various data and applications which are necessary for the operations of the electronic apparatus 100. In particular, the storing unit 110 may store the data necessary for the operations of the electronic apparatus 100, for example, OS, a route search application, a map data, etc. In addition, the storing unit 110 may store the data generated by the operations of the electronic apparatus 100, for example, a searched route data, a received image, etc.

Here, the storing unit 110 may be implemented using a built-in type storing element, for example, RAM (Random Access Memory), Flash Memory, ROM (Read Only Memory), EPROM (Erasable Programmable ROM) EEPROM (Electronically Erasable and Programmable ROM), a register, a hard disk, a removable disk, a memory card, USIM (Universal Subscriber Identity Module), etc. or a detachable type storing element, for example, a USB memory, etc.

The input unit 120 has a function for converting physical input from the outside of the electronic apparatus 100 into a specific electrical signal. Here, the input unit 120 may be all or part of a user input unit 121 and a microphone unit 123.

The user input unit 121 may receive a user's input, for example, a touch, a push operation, etc. Here, the user input unit 120 may be implemented using at least one among a various button types, touch sensor which receive touch inputs, and a near sensor for receiving an approaching motion.

The microphone unit 123 may receive a user's voice and sound from the inside or outside of the vehicle.

The output unit 130 is a device for outputting the data of the electronic apparatus 100. Here, the output unit 130 may be all or part of a display unit 131 and an audio output unit 133.

The display unit 131 is a device for outputting data that the electronic apparatus 100 may visually recognize. The display unit 131 may be implemented with a display unit provided at a front side of the housing of the electronic apparatus 100. Here, the display unit 131 is formed integral with the electronic apparatus 100 and may output a visual recognition data and is installed separate from the electronic apparatus 100 like the HUD and may output a visual recognition data.

The audio output unit 133 is a device for outputting the data that the electronic apparatus 100 may audibly recognize. The audio output unit 133 may be formed of a speaker which may output in the forms of sound the data which should be informed to the user of the electronic apparatus 100.

The communication unit 180 may provide to communicate with another device. The communication unit 180 may include, not limited to all or part of a location data unit 181, a wireless internet unit 183, a broadcast transceiver unit 185, a mobile communication unit 186, a local area communication unit 187 and a wired communication unit 189.

The location data unit 181 is a device for obtaining the location data through the GNSS (Global Navigation Satellite system). The GNSS means a navigation system which may calculate the location of the receiver terminal using radio signals from the satellite. As an example of the GNSS, there may, according to its operation body, be GPS (Global Positioning System), Galileo, GLONASS (Global Orbiting Navigational Satellite System), COMPASS, IRNSS (Indian Regional Navigational Satellite System), QZSS (Quasi-Zenith Satellite System), etc. The location data unit 181 of the electronic apparatus 100 according to an embodiment of the present invention may obtain a location data by receiving a GNSS signal which is served in a region where the electronic apparatus 100 is being used.

The wireless internet unit 183 is a device for connecting to the wireless internet, thus obtaining or transmitting the data. The wireless internet unit through the wireless internet unit 183 for connecting to the wireless internet may include, but not limited to, WLAN(Wireless LAN), Wibro(Wireless broadband), Wimax(World interoperability for microwave access), HSDPA(High Speed Downlink Packet Access), etc.

The broadcast transceiver unit 185 is a device for transmitting and receiving broadcast signals through various broadcast systems. The broadcast system for transmitting and receiving through the broadcast transceiver 185 may include, but not limited to, DMBT (Digital Multimedia Broadcasting Terrestrial), DMBS (Digital Multimedia Broadcasting Satellite), MediaFLO (Media Forward Link Only), DVBH (Digital Video Broadcast Handheld), ISDBT (Integrated Services Digital Broadcast Terrestrial), etc. The broadcast signal which may be transmitted or received through the broadcast transceiver unit 185 may include, but not limited to, a traffic data, a life data, etc.

The mobile communication unit 186 may communicate by connecting to a mobile communication network in compliance with various mobile communication criteria, for example, 3G (3rd Generation), 3GPP (3rd Generation Partnership Project), LTE (Long Term Evolution), etc.

The local area communication unit 187 is a device for the sake of a local area communication. The local area communication unit 187 may provide to communicate through Bluetooth, RFID (Radio Frequency Identification), infrared ray communication (IrDA, Infrared Data Association), UWB (Ultra WidBand), ZigBee, NFC (Near Field Communication), WiFi, etc.

The wired communication unit 189 is an interface device for connecting the electronic apparatus 100 to another device through a wired connection. The wired communication unit 119 may be a USB module which may communicate through the USB port.

The communication unit 180 may communicate with another device using at least one of the location data unit 181, a wireless internet unit 183, a broadcast transceiver unit 185, a mobile communication unit 186, a local area communication unit 187, and a wired communication unit 189.

As an example, in case where the electronic apparatus 100 does not include a camera function, using at least one of the local area communication unit 187 and the wired communication unit 189, it is possible to receive the images taken by the vehicle camera, for example, a black box, etc.

As another example, in case where a communication is made to multiple devices, any one of them communicate with the local area communication unit 187, and the other one of them may communicate through the wired communication unit 119.

The sensing unit 190 is a device for detecting the current state of the electronic apparatus 100 and may include, but not limited to, all or part of a motion sensing unit 191 and a light sensing unit 193.

The motion sensing unit 191 may detect the motion in the 3D space of the electronic apparatus 100. The motion sensing unit 191 may be a 3-axis geomagnetic sensor and a 3-axis acceleration sensor. The motion data obtained by the motion sensing unit 191 is combined with the location data obtained by the location data unit 181, thus calculating a more accurate trace than the vehicle with the electronic apparatus 100.

The light sensing unit 193 is a device for measuring surrounding illuminance of the electronic apparatus 100 and allows to change the brightness of the display unit 131 to the surrounding brightness using the illuminance data obtained through the light sensing unit 193.

The power unit 195 is a device for supplying power which is necessary for the operation of the electronic apparatus 100 and the operation of another device connected to the electronic apparatus 100. The power unit 195 may be a device for receiving power from external power source, for example, a battery in the electronic apparatus 100 or a vehicle. In addition, the power unit 195 may, depending on the type for receiving power, be implemented in the form of a wired communication module 119 or a device for receiving power through a wireless connection.

Meanwhile, the control unit 170 controls the whole operations of the electronic apparatus 100. In more detail, the control unit 170 may control all or part of the storing unit 110, the input unit 120, the output unit 130, a link generation unit 140, the AR provision unit 160, the communication unit 180, the sensing unit 190 and the power unit 195.

More specifically, the control unit 170 may obtain a map data from the storing unit 110 of the electronic apparatus 100 or obtain a map data from an external database DB being separate from the electronic apparatus 100 or obtain a map data from another electronic apparatus. Here, the map data is a data which represents a map of the current location and a surrounding region and may include a plurality of links representing a road of the multiple regions, an attribute information with respect to the multiple links, a node connecting the links and an attribute information with respect to the node. The attribute information with respect to the link may include, but is not limited to, an information representing whether the link is a bidirectional link or a single direction link, an information regarding the number of lanes of the link, an information regarding road type of the link (for example, a highway, a city highway, a national highway, a local road, a city road, etc.), a guide code information (for example, an information which guides a speed limit, traffic enforcement, etc.), etc. In addition, the attribute information with respect to the node may include a direction attribute information. Here, the bidirectional link may mean a link defining a two-way road as one link, namely, a left side road and a right side road about the central line of the road.

The configuration of such a map data is simply an exemplary embodiment of the present invention, not limiting thereto. Therefore, it may be implemented in different form depending on the manufacturing companies of the map data.

The control unit 170 may control the link generation unit 140 so that a vehicle identifier may be displayed on a spot that is corresponding to an actual road where the vehicle is located. More specifically, the control unit 170 may control the link generation unit 140 to determine a bidirectional link defining a two-way road as one link among the links which forms an obtained map data and generate a virtual link by moving the determined bidirectional link based on a road width. In this case, the control unit 170 may control the display unit 131 to display, by using the generated virtual link, a guide screen, for example, a route guide screen, a real time position guide screen, etc.

For example, if the bidirectional link is included in a link corresponding to the Y-shaped road, the link generation unit 140 may generate a virtual link by moving the bidirectional link in the first direction by using the movement size determined based on the road width with respect to the bidirectional link and may generate a correction link by connecting the virtual node of the virtual link and the node of the single direction link being close to the bidirectional link. Here the link corresponding to the Y-shaped road may be a link wherein the bidirectional link is divided into at least two single directional links or at least two single directional links are combined into a bidirectional link.

As another example, if the bidirectional link is included in a link which corresponds to the U-turn road, the link generation unit 140 may generate first virtual link and second virtual link by moving the bidirectional link into first direction and second direction using the movement size which is determined based on the width of the road with respect to the bidirectional link, generate an interpolating point at a predetermined distance apart from the node of the bidirectional link, and generate a correction link by connecting the interpolating point with the first virtual link and second virtual link.

To this end, if a user's route guide request is received, the display unit 131 may display a route guide screen which represents a vehicle identifier representing a real time location of the vehicle on a route that is generated based on the correction link. In addition, even though a user's separate input is not received, the display unit 131 may display a real time position guide screen which represents a vehicle identifier representing a real time position of the vehicle on the generated correction link.

Here, the method for generating a virtual link with respect to a bidirectional link of the link generation unit 140 will be described later with reference to FIGS. 3 to 6.

Meanwhile, the control unit 170 controls the AR provision unit 160 for the electronic apparatus 100 to perform a driving-related guide based on the AR. Here, the augmented reality may be a method of visually overlaying additional information (for example, graphic component representing a point of interest (POI), a graphic component representing a path to a destination, etc.) on a screen displaying a real world that a user actually sees and providing the overlaid additional information. In this case, the control unit 170 generates an indicator for performing a driving-related guide while interlocking with the AR provision unit 160 and the link generation unit 140 and outputting the generated indicator on the display unit 131. For example, the AR provision unit 160 generates a route guide indicator based on the generated virtual link, and the control unit 170 may output the generated route guide indicator on the display unit 131.

Figure 2:
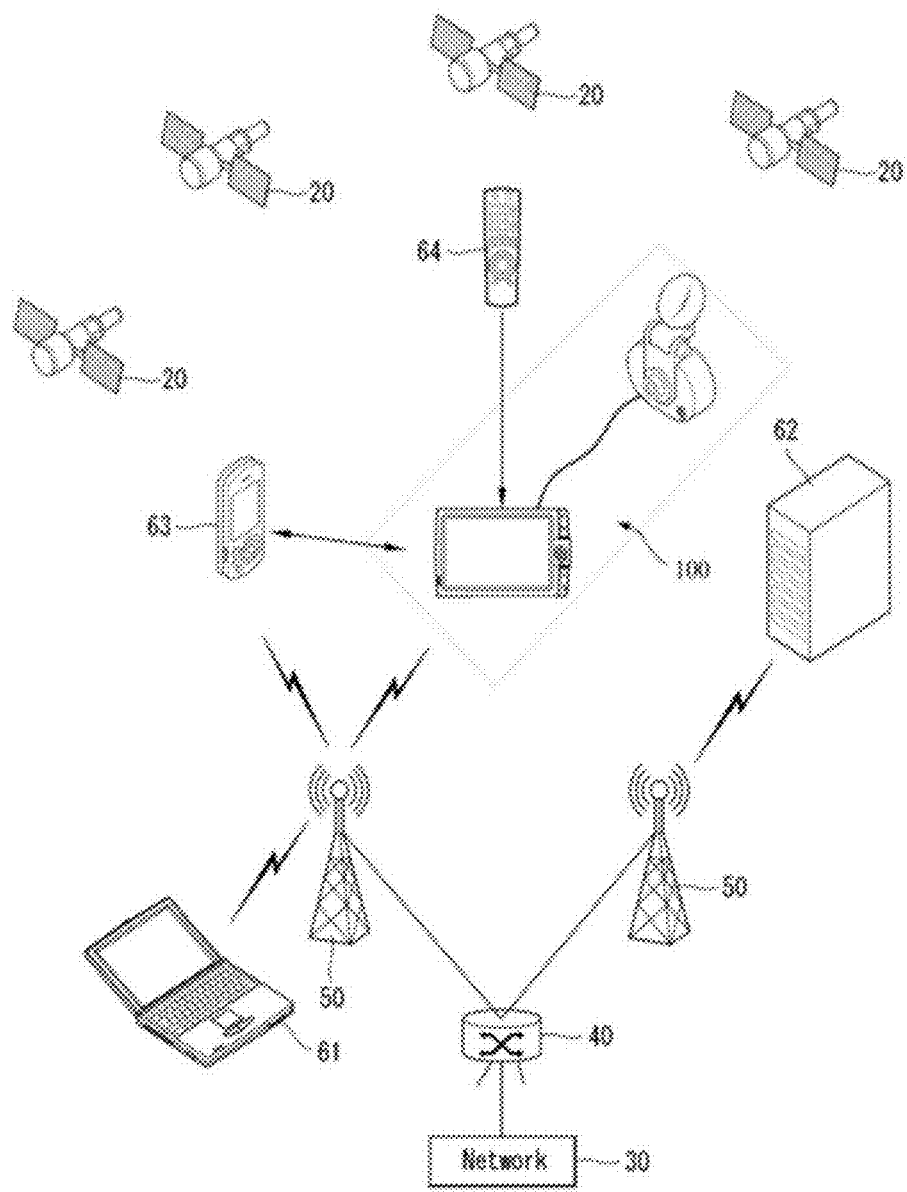
FIG. 2 is a view for describing a system network connected to an electronic apparatus according to an exemplary embodiment of the present invention.

Here, the augmented reality may be provided using the HUD which uses the wind shield of the vehicle or an image overlay which uses a separate image output device. The augmented reality provision unit 160 may generate a real image and an interface image, etc. which overlaps on the glass. Based on the above features, it is possible to implement an augmented reality navigation or a vehicle infortainment system FIG. 2 is a view for describing a system network connected with the electronic apparatus according to an exemplary embodiment of the present invention. Referring to FIG. 2, the electronic apparatus 100 according to an exemplary embodiment of the present invention may be implemented with various apparatuses, for example, a navigation, a black box, a smart phone or other vehicle AR interface provision apparatuses and may be connected with various communication networks and other electronic devices 61 to 64.

In addition, the electronic apparatus 100 may calculate the current location and time while interlocking with the GPS module in accordance with a radio signal from the satellite 20.

Each satellite 20 may transmit and receive an L-band frequency having a different frequency band. The electronic apparatus 100 may calculate the current location according to the time that the L-band frequency from each satellite 20 reaches the electronic apparatus 100.

Meanwhile, the electronic apparatus 100 may be wirelessly connected to the network 30 through the control stations (40, ACR) and the base station (50, RAS) through the communication unit 180. When the electronic apparatus 100 has accessed the network 30, it may be indirectly connected to other electronic devices 61 and 62 connected to the network 30, thus communicating data.

Meanwhile, the electronic apparatus 100 may indirectly access the network 30 through another device 63 having a communication function. For example, if the electronic apparatus 100 does not equip a module through which to connect to the network 30, it is possible to communicate with another device 63 which has a communication function through a local area communication module, etc.

Figure 3:
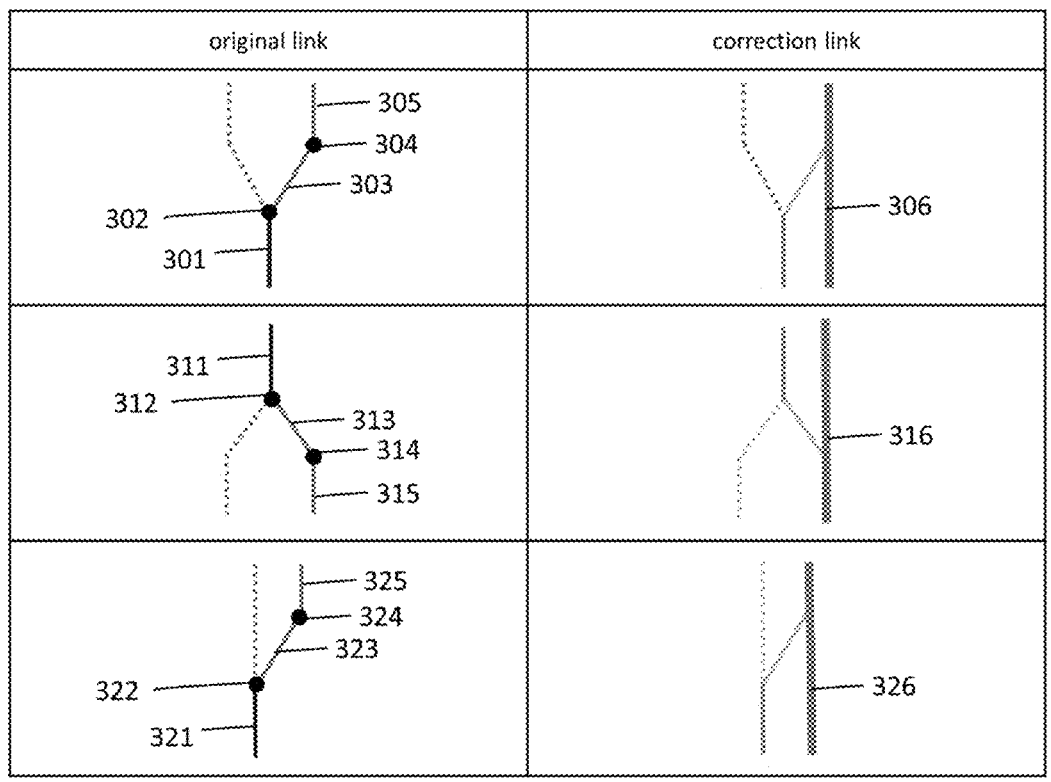
FIG. 3 is a view for describing a method for generating a correction link with respect to a link which corresponds to a Y-shaped road according to an exemplary embodiment of the present invention.
Figure 4:
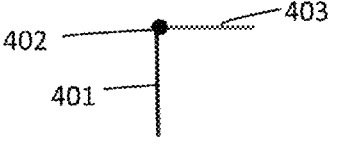
FIG. 4 is a view for describing a method for generating a correction link with respect to a link which corresponds to a right turn road according to an exemplary embodiment of the present invention.
Figure 5:
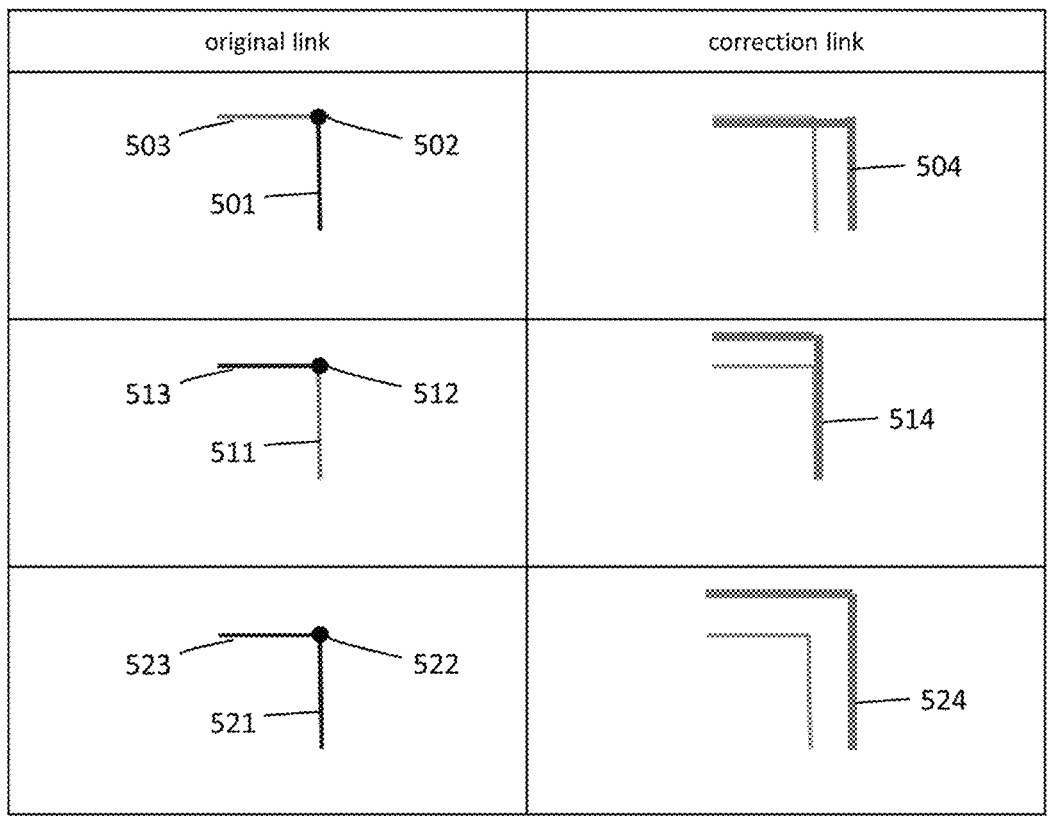
FIG. 5 is a view for describing a method for generating a correction link with respect to a link corresponding to a left turn road according to an exemplary embodiment of the present invention.
Figure 6:
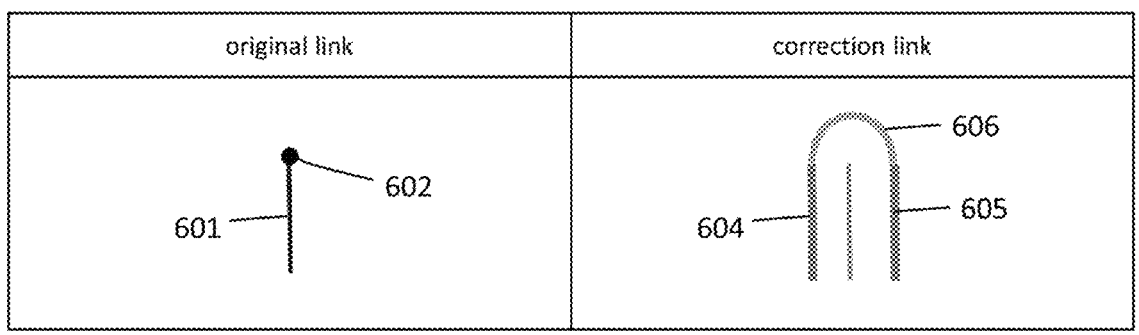
FIG. 6 is a view for describing a method for generating a corresponding link with respect to a link corresponding to a U-turn road according to an exemplary embodiment of the present invention.

FIG. 3 is a view for describing a method for generating a correction link with respect to a link corresponding to the Y-shaped road according to an exemplary embodiment of the present invention. FIG. 4 is a view for describing a method for generating a correction link with respect to a link which corresponds to a right turn road according to an exemplary embodiment of the present invention. FIG. 5 is a view for describing a method for generating a correction link with respect to a link corresponding to a left turn road according to an exemplary embodiment of the present invention. FIG. 6 is a view for describing a method for generating a corresponding link with respect to a link corresponding to a U-turn road according to an exemplary embodiment of the present invention. Referring to FIGS. 3 to 6, a line (303,305,313,315,323,325,403,411,503,511) means a single direction link, a line (301,311,321,401,413, 421,423,501,513,521,523,601) means a bidirectional link, and a line (306,316,326,404,414,424,504,514,524,604,605, 606) means a correction link.

In addition, a solid line is a link where a vehicle will run, and a dotted line means a link where a vehicle does not run. In case of Korea, the vehicle is regulated to run on a right side, so the link where the vehicle will run may be located on the right side about the central line of the road, and the link where the vehicle will run may be located on the right side, as shown in FIG. 3. However, in case of Japan, the vehicle is regulated to run on the left side. Therefore, the link where the vehicle will run may be located on the left side about the central line of the road, opposite to the case in FIG. 3.

Referring to FIG. 3, the link corresponding to the Y-shaped road is a link wherein the bidirectional link is divided into at least two single direction links or at least two single directional links are combined into a bidirectional link.

First, the link generation unit 140 may detect a link corresponding to the Y-shaped road using a map data, and determine the bidirectional links 301, 311 and 321 from the detected link.

In addition, the link generation unit 140 may determine the movement sizes of the bidirectional links 301, 311 and 321 based on the road widths with respect to the bidirectional links 301, 311 and 321. More specifically, the link generation unit 140 may calculate the width of the road corresponding to the bidirectional links 301, 311 and 321 using the road type information. In addition, the link generation unit 140 may determine the movement sizes of the bidirectional links 301, 311 and 321 by using the calculated widths of the roads. For example, if the road is a highway, the width of the road may be calculated by multiplying a predetermined value corresponding to the width of one lane, for example, 3.5 meter with the number of lines, and the calculated width of the road is divided by a predetermined value.

In addition, the link generation unit 140 may determine the movement direction of the bidirectional links 301, 311 and 321. More specifically, the vehicle traffic directions are different by country, so the link generation unit 140 may determine the movement direction using the vehicle traffic direction information table for each country. In case of Korea, the right side pass is regulated, and in case of Japan, the left side pass is regulated. For this reason, in Korea, the link generation unit 140 may determine the movement direction of the bidirectional links 301, 311 and 321 to the vertical right direction with respect to the bidirectional links 301, 311 and 321, and in case of Japan, may determine the movement direction of the bidirectional links 301, 311 and 321 to the vertical left direction with respect to the bidirectional links 301, 311 and 321.

In addition, the link generation unit 140 may generate a virtual link by moving the bidirectional links 301, 311 and 321 based on the determined movement size and movement direction.

In addition, the link generation unit 140 may generate correction links 306, 316 and 326 by connecting the single direction links 305, 315 and 325 with the virtual link through the connections between the nodes of the virtual links corresponding to the nodes 302, 312 and 322 with respect to the bidirectional link and the nodes 304, 314 and 324 of the single direction links close to the bidirectional links 301, 311 and 321.

In this case, at the Y-shaped road where the bidirectional link is divided into at least two single direction links like the rows 2 and 4 in the table in FIG. 3, the correction links like 306 and 326 may be generated.

In addition, at the Y-shaped road where two single directional links are combined into a bidirectional link like the row 3 of the table in FIG. 3, it is possible to generate the correction link like 316.

Meanwhile, in the method for generating the correction link with respect to the link corresponding to the right turn road, referring to FIG. 4, the link generation unit 140 may determine the bidirectional links 401, 413, 421 and 423 using the map data.

In addition, the link generation unit 140 may calculate the width of the road corresponding to the bidirectional links 401, 413, 421 and 423 by using information on the number of lines and road type information with respect to the bidirectional links 401, 413, 421 and 423. In addition, the link generation unit 140 may determine the movement sizes of the bidirectional links 401, 413, 421 and 423 using the calculated width of the road.

In addition, the link generation unit 140 may determine the movement directions of the bidirectional links 401, 413, 421 and 423 by using the vehicle traffic direction information table.

In addition, the link generation unit 140 may generate a virtual link by moving the bidirectional links 401, 413, 421 and 423 based on the determined movement size and movement direction.

In this case, on the right turn road to which the bidirectional link and the single direction link are connected like the rows 2 and 3 of the table in FIG. 4, it is possible to generate the correction links like 404 and 414.

In addition, on the right turn road to which the bidirectional link and the bidirectional link are connected like the row 4 of the table in FIG. 4, it is possible to generate a correction link like 424.

Meanwhile, in the method for generating a correction link with respect to the link corresponding to the left turn road, referring to FIG. 5, it is possible to determine bidirectional links 501, 513, 521 and 523 using the map data.

In addition, the link generation unit 140 may calculate the width of the road corresponding to the bidirectional links 501, 513, 521 and 523 by using the information on the number of lines and road type information with respect to the bidirectional links 501, 513, 521 and 523. In addition, the link generation unit 140 may determine the movement sizes of the bidirectional links 501, 513, 521 and 423 using the calculated width of the road.

In addition, the link generation unit 140 may determine the movement directions of the bidirectional links 501, 513, 521 and 523 by using the vehicle traffic direction table.

In addition, the link generation unit 140 may generate a virtual link by moving the bidirectional links 501, 513, 521 and 523 based on the determined movement size and movement direction.

In this case, on the left turn road to which the bidirectional link and the single direction link are connected like the rows 2 and 3 of the table in FIG. 5, it is possible to generate a correction link like 504 and 514.

In addition, on the left turn road to which the bidirectional link and the single direction link are connected like the row 4 of the table in FIG. 5, it is possible to generate a correction link like 524.

Meanwhile, in the method for generating a correction link with respect to the link corresponding to the U-turn road, referring to FIG. 6, the link generation unit 140 may determine a bidirectional link 601 included in the link corresponding to the U-turn road using a map data. For example, as the user's route guide request, the link generation unit 140 detects the U-turn road from the searched route, and detects link corresponding to the detected U-turn road, and thus determines the bidirectional link 601.

In addition, the link generation unit 140 may generate a first virtual link 605 by moving the bidirectional link 601 into the vertical right direction by using the movement size that is determined based on the width of the road with respect to the bidirectional link 601 and a second virtual link 604 by moving the bidirectional link into the vertical left direction by using the movement size that is determined based on the width of the road with respect to the bidirectional link 601.

In addition, the link generation unit 140 may generate an interpolating point at a predetermined distance apart from the node 602 of the bidirectional link 601. For example, the link generation unit 140 may generate interpolating points at regular distances about the node 602 at a portion of the right vertical direction (0° direction), a portion of the right up direction (45° direction), a portion of the up vertical direction (90° direction), a portion of the left up direction (135° direction), and a portion of the left vertical direction (180° direction).

In addition, the link generation unit 140 may generate a third virtual link 606 which connects the generated interpolating point, the virtual node of the first virtual link 605 and the virtual node of the second virtual link 604.

In addition, the link generation unit 140 may generate a correction link which connects the generated first virtual link 605, the second virtual link 604 and the third virtual link 606.

Figure 7:
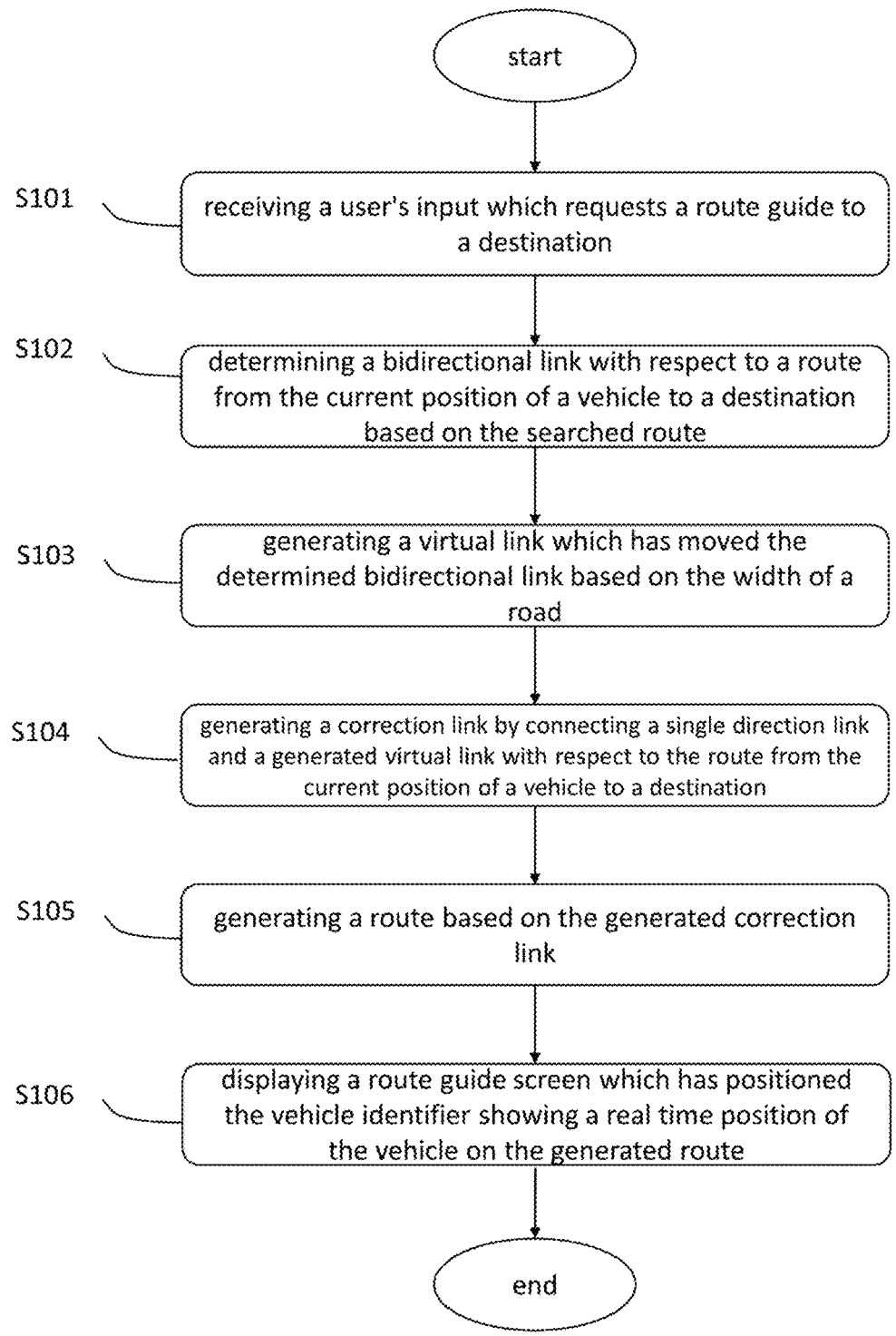
FIG. 7 is a flow chart for describing a route guide method according to an exemplary embodiment of the present invention.

FIG. 7 is a flow chart for describing a route guide method according to an exemplar embodiment of the present invention. Referring to FIG. 7, the input unit 120 receives a user input who requests a route guide to a destination (S101). In this case, the control unit 170 may search a route from the current location of the vehicle to the destination using the map data.

In addition, the link generation unit 140 may determine a bidirectional link with respect to a route from the current location of the vehicle to the destination based on the searched route (S102). More specifically, the link generation unit 140 may determine a bidirectional link with respect to various types of roads as illustrated in FIGS. 3 to 6 using the searched route.

In addition, the link generation unit 140 may generate a virtual link by moving the determined bidirectional link based on the width of the road (S103).

In addition, the link generation unit 140 may generate a correction link by connecting a single direction link with respect to the route from the current location of the vehicle to the destination and the generated virtual link (S104). More specifically, the link generation unit 140 may generate a correction link with respect to the route from the current location of the vehicle to the destination by connecting various types of generated correction links as illustrated in FIGS. 3 to 6.

In addition, the control unit 170 may generate a route based on the generated correction link (S105).

In addition, the display unit 141 may display a route guide screen which represents the vehicle indicator representing the real time location of the vehicle on the generation route (S106).

Figure 8:
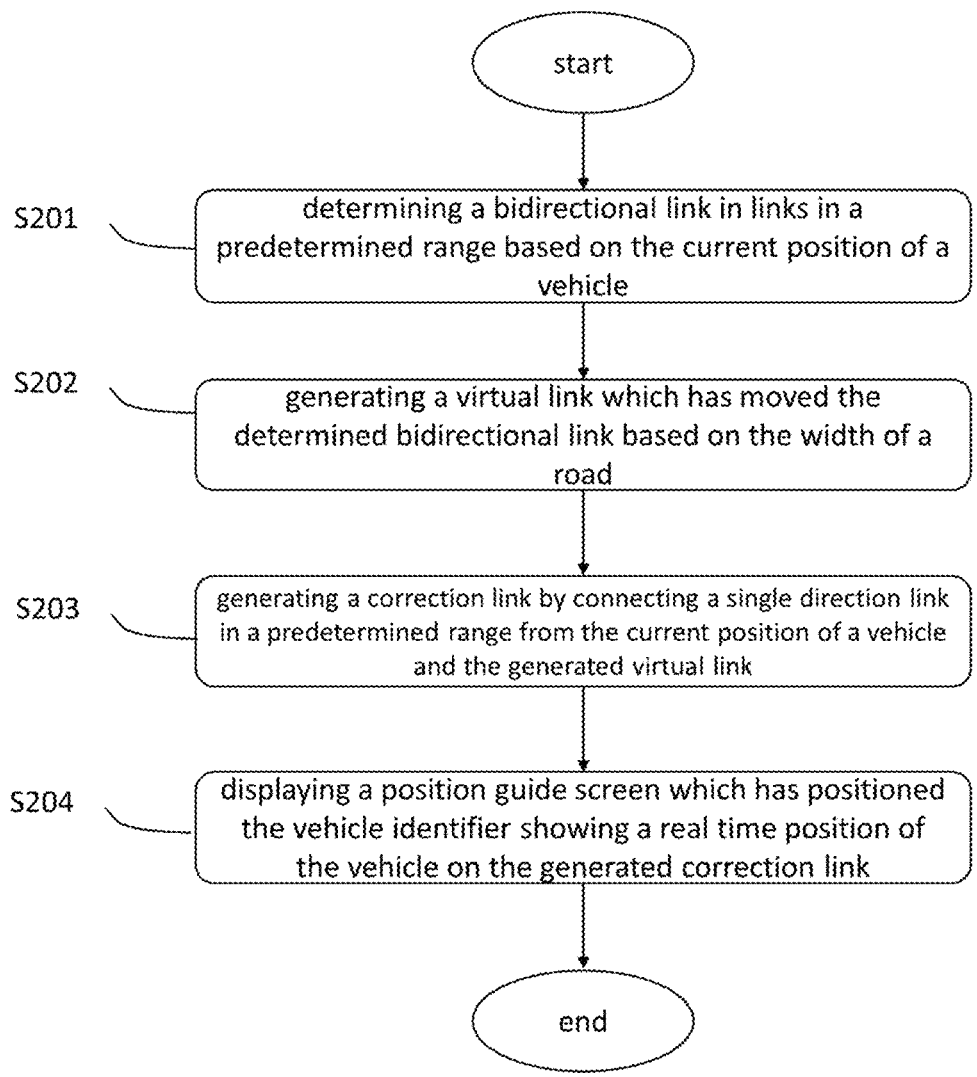
FIG. 8 is a flow chart for describing a real time location guide method according to an exemplary embodiment of the present invention.

FIG. 8 is a flow chart for describing a real time location guide method according to an exemplary embodiment of the present invention. Here, the real time location guide may be automatically executed so as to display the real time location of the vehicle on the screen of the display unit 31 even though a separate input is not received from the user like the route guide request.

Referring to FIG. 8, the link generation unit 140 may determine a bidirectional link from the links which are in a predetermined range from the current location of the vehicle (S201). For example, the link generation unit 140 may determine a bidirectional link which is located between a predetermined range from the links corresponding to the current position of the vehicle.

In addition, the link generation unit 140 may generate a virtual link by moving the determined bidirectional link based on the width of the road (S202).

In addition, the link generation unit 140 may generate a correction link by connecting the single direction link in a predetermined range from the current position of the vehicle and the generated virtual link (S203).

In addition, the display unit 141 may display a position guide screen which represents the vehicle identifier representing the real time position of the vehicle on the generated correction link (S204).

Figure 9:
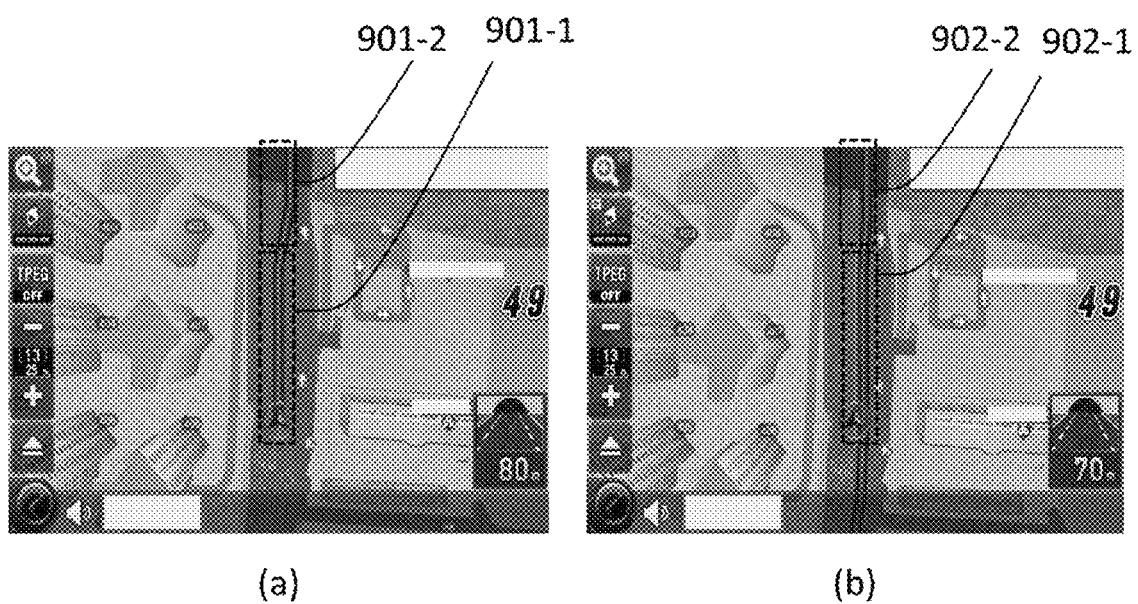
FIG. 9 is a view illustrating a comparison of a route guide screen before and after an actual application of a method according to an exemplary embodiment of the present invention.

FIG. 9 is a view illustrating a comparison between the route guide screens before and after the application of the method according to an exemplary embodiment of the present invention. More specifically, FIGS. 9A and 9B are views illustrating a comparison between the route guide screens before and after the application of the method according to an exemplary embodiment of the present invention in case where the vehicle is running on the right side about the central line of the road like in Korea on the Y-shaped road wherein a bidirectional link is divided into at least two single direction links. Referring to FIG. 9A, the route indicator 901-1 on the bidirectional link is displayed in the center of the road before the application of the method according to an exemplary embodiment of the present invention, and the route indicator 901-2 on the single direction link is displayed on the right side about the central line of the road. Namely, the vehicle always run on the right side, but the route indicator 901-1 on the bidirectional link is displayed in the center of the road. To this end, before the application of the method according to an exemplary embodiment of the present invention, the driver who had checked the route indicator is confused to be in the driving on the center of the road or as to drive on the center of the road.

Referring to FIG. 9B, after the application of the method according to an exemplary embodiment of the present invention, the route indicator 902-1 on the bidirectional link is displayed on the right side about the central line of the road, and the route indicator 902-2 on the single direction link is displayed on the right side about the central line of the road, thus displaying a route line in a right way. Namely, the route indicators 902-1 and 902-2 may be displayed on the right road where the vehicle is now running or the vehicle should run. To this end, after the application of the method according to an exemplary embodiment of the present invention, an accurate route indicator may be provided to the driver.

Figure 10:
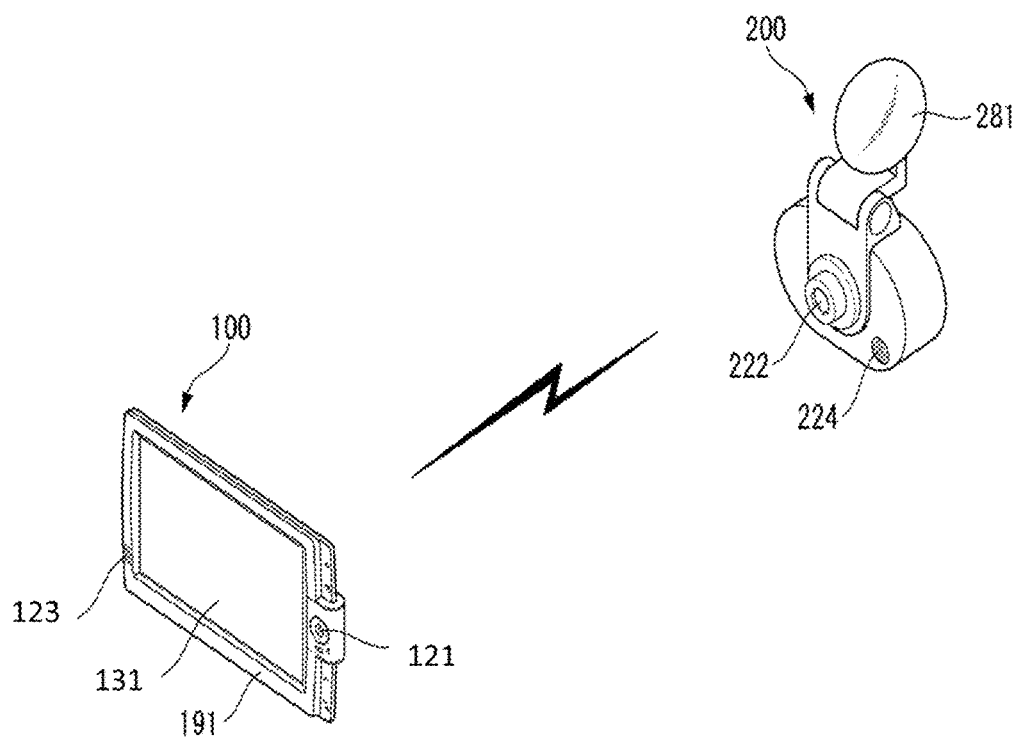
FIG. 10 is a view for describing an implementation type in case where a camera and an electronic apparatus are separated according to an exemplary embodiment of the present invention.
Figure 12:
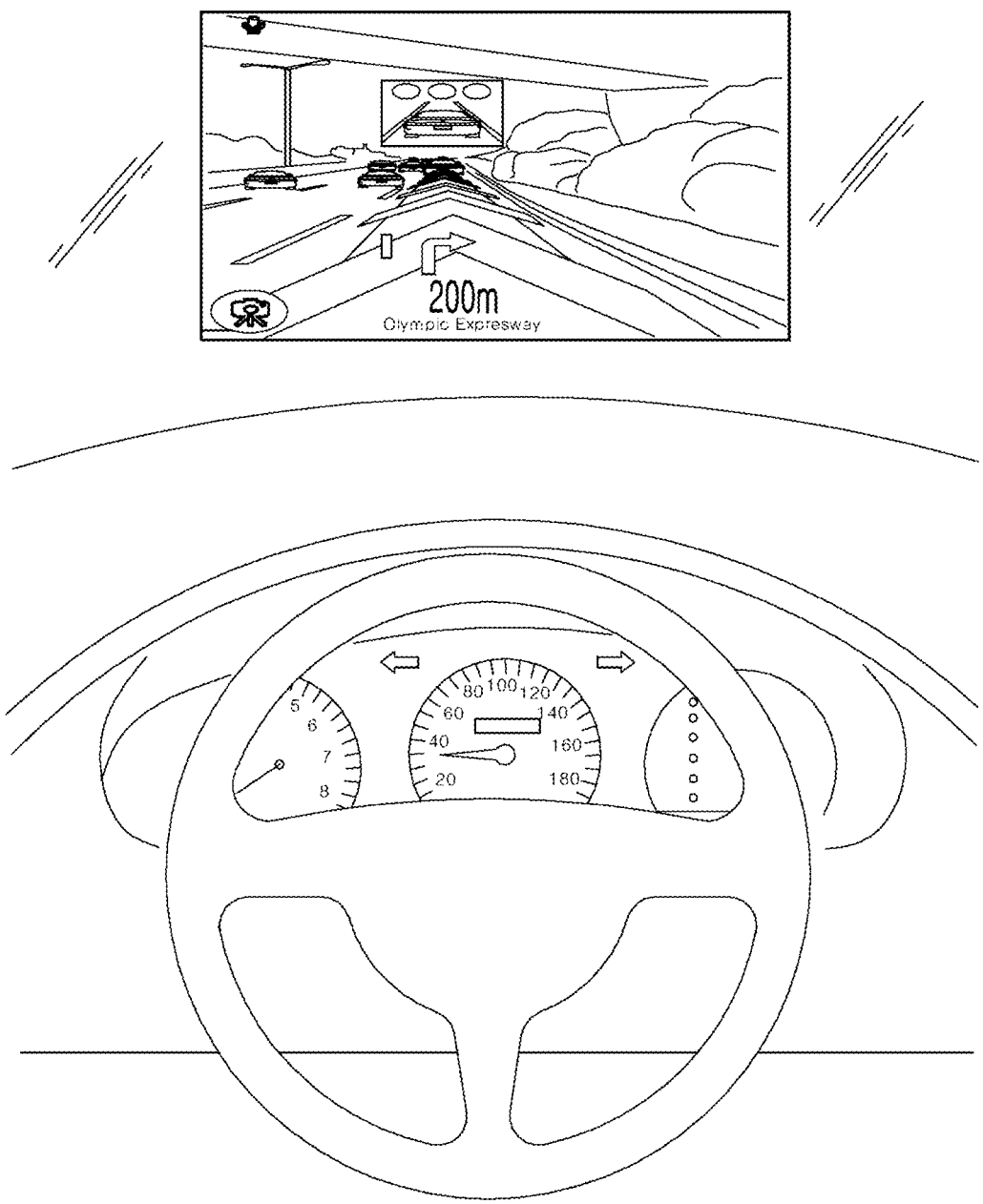
FIG. 12 is a view for describing an implementation type wherein a HUD (Head-Up Display) and an electronic apparatus are used according to an exemplary embodiment of the present invention.

FIG. 10 is a view illustrating an implementation type in case where a camera and an electronic apparatus are separated according to an exemplary embodiment of the present invention. FIG. 10 is a view illustrating an implementation type in case where a camera and an electronic apparatus are separated according to an exemplary embodiment of the present invention. Referring to FIG. 12, a vehicle black box 200 which is provided separate from the vehicle navigation 100 may be included in the system according to an exemplary embodiment of the present invention using a wired/wireless communication method.

The vehicle navigation 100 may include, but is not limited to, a display unit 145 disposed at a front side of a navigation housing 191, a navigation operation key 193, and a navigation microphone 195.

The vehicle black box 200 may obtain a data of a vehicle while the vehicle is running or stops. Namely, it is possible to take picture during the running of the vehicle, and it is possible to take picture while the vehicle stops. The quality of the image obtained through the vehicle black box 200 may remain constant or may be changed. For example, it is possible to store key images while minimizing the limited storing space by increasing the quality of the images or conventionally lowering the quality of the images before or after the occurrence of an accident.

The vehicle black box 200 may include, but is not limited to, a black box camera 222, a black box microphone 224 and an attaching unit 281.

Meanwhile, FIG. 10 illustrates a configuration wherein the vehicle black box 200 being separate from the vehicle navigation 100 is connected by a wired/wireless connection method, but the vehicle navigation 100 and the vehicle black box 200 may not be connected by the wired/wireless connection method. In this case, when a storing medium for storing the photographed images of the black box 200 is inserted in the electronic apparatus 100, the electronic apparatus 100 may receive the photographed images. Meanwhile, the vehicle black box 200 may integrally equip the function of the vehicle navigation 100 or the vehicle navigation 100 may integrally equip a camera. The above configuration will be described later with reference to FIG. 13.

Figure 11:
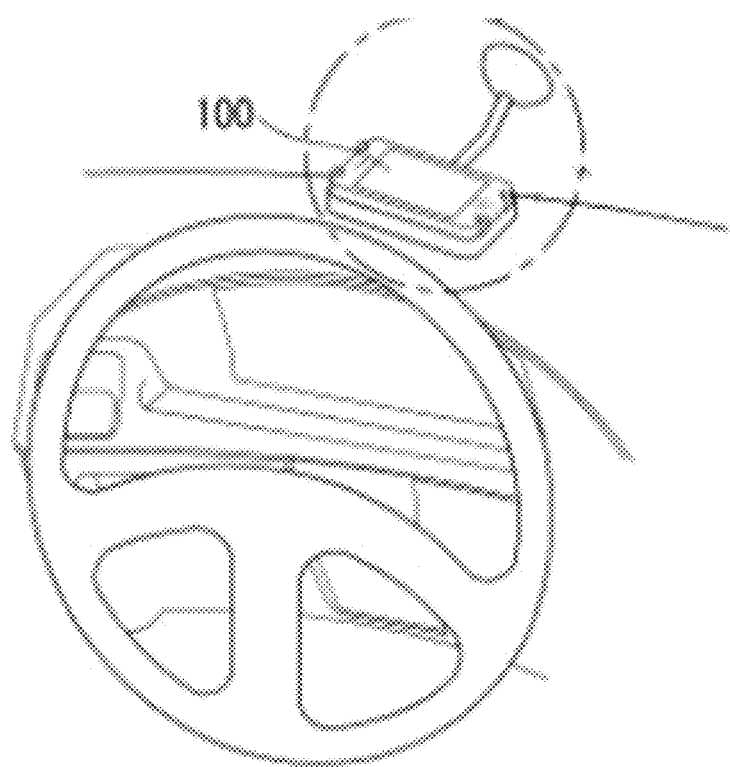
FIG. 11 is a view for describing an implementation type in case where a camera and an electronic apparatus are integrated according to an exemplary embodiment of the present invention.

FIG. 11 is a view for describing an implementation type in case where a camera and an electronic apparatus are integrated according to an exemplary embodiment of the present invention. FIG. 11 is a view for describing an implementation type in case where a camera and an electronic apparatus are integrated according to an exemplary embodiment of the present invention. Referring to FIG. 13, in case where the electronic apparatus equips a camera function, the user may allow the camera part of the electronic apparatus to take picture of the forward scene of the vehicle and the display part of the electronic apparatus to recognize the user.

To this end, the system according to an exemplary embodiment of the present invention may be implemented.

FIG. 12 is a view for describing an implementation type wherein a HUD (Head-Up Display) and an electronic apparatus are used according to an exemplary embodiment of the present invention. FIG. 12 is a view for describing an implementation type wherein a HUD (Head-Up Display) and an electronic apparatus are used according to an exemplary embodiment of the present invention. Referring to FIG. 14, the electronic apparatus may provide a head up display and display an AR guide screen on the head up display by a wired/wireless communication.

Meanwhile, the control method of an electronic apparatus according to various exemplary embodiments of the present invention may be implemented with various codes, which may be stored in various non-transitory computer readable medium and may be supplied to each server or instrument.

Here, the non-transitory computer readable medium is not a medium which is able to store data for short time period like a register, a cash, a memory, etc. but is a medium which is able to semi-permanently store such data and may be read by an instrument. More specifically, the above various applications or programs may be stored in a non-transitory computer readable medium, for example, CD, DVD, a hard disk, a blue ray dusk, USB, a memory card, ROM, etc. and may be provided.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A method for calculating a real time location of an electronic apparatus on a map, comprising:
    determining a bidirectional link among a plurality of links forming a map data, the bidirectional link defines a two-way road as one link;
    generating a virtual link by moving the determined bidirectional link based on the width of a road; and
    displaying a guide screen using the generated virtual link.

2. The method of claim 1, further comprising:
    receiving a user input which requests a route guide to a destination, and
    wherein the determining step determines a bidirectional link with respect to a route from the current location of a vehicle to the destination by using the map data.

3. The method of claim 2, further comprising:
    generating a correction link by connecting a single direction link with respect to a route from the current location of the vehicle to the destination with the generated virtual link;
    generating the route based on the generated correction link; and
    wherein the displaying step displays a route guide screen which represents the vehicle identifier representing a real time location of the vehicle on the generated route.

4. The method of claim 1, wherein the determining step determines a bidirectional link among the links in a predetermined range based on the current location of the vehicle, and further comprising:
    generating a correction link by connecting a single direction link in a predetermined range from the current location of the vehicle and the generated virtual link, and
    wherein the displaying step displays a location guide screen which represents the vehicle identifier representing a real time location of the vehicle on the generated correction link.

5. The method of claim 1, wherein if the bidirectional link is included in the link corresponding to a Y-shaped road, the step for generating the virtual link further includes generating a virtual link which by moving the bidirectional link into the first direction by using a movement size which is determined based on the width of a road with respect to the bidirectional link, and
    further comprising:
    generating a correction link by connecting a virtual node of the virtual link and a node of a single direction link being close to the bidirectional link,
    wherein the link corresponding to the Y-shaped road is a link wherein the bidirectional link is divided into at least two single direction links or at least two single directional links are combined into a bidirectional link.

6. The method of claim 1, wherein if the bidirectional link is included in a link corresponding to a U-turn road, the step for generating the virtual link includes generating first virtual link and second virtual link by moving the bidirectional link into first direction and second direction using the movement size which is determined based on the width of the road with respect to the bidirectional link, and
    further comprising:
    generating an interpolating point at a predetermined distance apart from the node of the bidirectional link; and
    generating a correction link by connecting the interpolating point and the first virtual link and second virtual link.

7. The method of claim 1, wherein the displaying step includes:
    generating an indicator for an augmented reality (AR); and
    displaying a guide screen which displays the generated indicator through the AR.

8. An electronic apparatus, comprising:
    a display unit displaying a screen;
    a storing unit storing a map data;
    a link generation unit, implemented on a processor operatively coupled to a memory, determining a bidirectional link, that defines a two-way road as one link, among a plurality of links forming a map data, and generating a virtual link by moving the determined bidirectional link based on the width of a road; and
    a control unit controlling the display unit to display a guide screen using the generated virtual link.

9. The apparatus of claim 8, further comprising:
    an input unit receiving a user input which requests a route guide to a destination, and
    wherein the link generation unit determines a bidirectional link with respect to the route from the current location of the vehicle to the destination by using the map data.

10. The apparatus of claim 9, wherein the link generation unit generates a correction link by connecting a single direction link with respect to a route from the current location of the vehicle to the destination and the generated virtual link, and
    the control unit generates a route based on the generated correction link and controls the display unit to display a route guide screen which represents the vehicle identifier representing a real time location of the vehicle on the generated route.

11. The apparatus of claim 8, wherein the link generation unit determines a bidirectional link among the links in a predetermined range based on the current location of the vehicle and generates a correction link by connecting a single direction link in a predetermined range from the current location of the vehicle and the generated virtual link, and
    the control unit controls the display unit to display a location guide screen which represents the vehicle identifier representing a real time location of the vehicle on the generated correction link.

12. The apparatus of claim 8, wherein if the bidirectional link is included in a link corresponding to a Y-shaped road, the link generation unit generates a virtual link by moving the bidirectional link in the first direction using the movement size determined based on the width of the road with respect to the bidirectional link, and generates a correction link by connecting a virtual node of the virtual link and a node of the single direction link close to the bidirectional link, and the link corresponding to the Y-shaped road is a link wherein the bidirectional link is divided into at least two single directional links or at least two single directional links are combined into a bidirectional link.

13. The apparatus of claim 8, wherein if the bidirectional link is included in a link corresponding to the U-turn road, the link generation unit generates first virtual link and second virtual link by moving the bidirectional link into first direction and second direction using the movement size determined based on the width of the road with respect to the bidirectional link, generates an interpolating point at a predetermined distance apart from the node of the bidirectional link, and generates a correction link by connecting the interpolating point and the first virtual link and second virtual link.

14. The apparatus of claim 8, further comprising:
an augmented reality (AR) provision unit which generates an indicator for an AR, and
wherein the display unit displays a guide screen which displays the generated indicator through the AR.

15. A non-transitory computer readable recording medium which has a program for executing a method, the method comprising:
determining a bidirectional link among a plurality of links forming a map data, the bidirectional link defines a two-way road as one link;
generating a virtual link by moving the determined bidirectional link based on the width of a road; and
displaying a guide screen using the generated virtual link.

\* \* \* \* \*